United States Patent [19]
Littecke et al.

[11] Patent Number: 5,676,496
[45] Date of Patent: Oct. 14, 1997

[54] METAL CUTTING INSERTS HAVING SUPERHARD ABRASIVE BODIES AND METHODS OF MAKING SAME

[75] Inventors: Peter Littecke, Huddinge, Sweden; Scott M. Packer, Pleasant Grove, Utah; Ronald B. Crockett, Orem, Utah; Ghanshyam Rai, Sandy, Utah

[73] Assignees: Smith International, Inc., Houston, Tex.; Sandvik Aktiebolag, Sandviken, Sweden

[21] Appl. No.: 723,810

[22] Filed: Sep. 30, 1996

Related U.S. Application Data

[63] Continuation of Ser. No. 446,490, May 22, 1995, abandoned.

[51] Int. Cl.$^6$ ................................. B23B 27/14
[52] U.S. Cl. .................. 407/118; 407/119; 408/144; 408/145; 51/293
[58] Field of Search ..................... 407/118, 119, 407/116; 408/144, 145; 51/293, 295; 175/432, 433, 434

[56] References Cited

U.S. PATENT DOCUMENTS

| | | | |
|---|---|---|---|
| 3,369,283 | 2/1968 | Colding | 407/118 X |
| 4,437,800 | 3/1984 | Araki et al. | 407/118 X |
| 4,561,810 | 12/1985 | Ohno | 407/118 |
| 4,690,691 | 9/1987 | Komanduri | 51/293 |
| 4,714,385 | 12/1987 | Komanduri | 407/118 X |
| 4,866,885 | 9/1989 | Dodsworth | 51/293 |
| 4,991,467 | 2/1991 | Packer . | |
| 5,115,697 | 5/1992 | Rodriquez et al. . | |
| 5,139,372 | 8/1992 | Tanabe et al. | 408/145 X |
| 5,183,362 | 2/1993 | Kuroyama | 407/119 X |
| 5,215,415 | 6/1993 | Fukuoka et al. | 407/119 X |

FOREIGN PATENT DOCUMENTS

| | | | |
|---|---|---|---|
| 0019461 | 11/1980 | European Pat. Off. | 407/119 |
| 4336903 | 11/1992 | Japan | 408/145 |
| 2037629 | 7/1980 | United Kingdom | 408/145 |

*Primary Examiner*—Daniel W. Howell
*Assistant Examiner*—Henry W. H. Tsai
*Attorney, Agent, or Firm*—Burns, Doane, Swecker & Mathis, L.L.P.

[57] ABSTRACT

A metal cutting insert comprises a carbide substrate, and at least one body of superhard abrasive material, such as PCD or PCBN, bonded to an edge surface of the substrate and extending from one side surface to the other side surface of the substrate. There can be a plurality of superhard bodies disposed at respective corners of the substrate. The abrasive material is applied to the substrate in a container and then sintered and simultaneously bonded to the substrate by an elevated pressure/temperature step. Inserts can be made in rod form (i.e., in one piece) and then the rod can be transversely sliced into thin inserts; or the inserts can be made in separate pieces, with or without separators within the container.

10 Claims, 3 Drawing Sheets

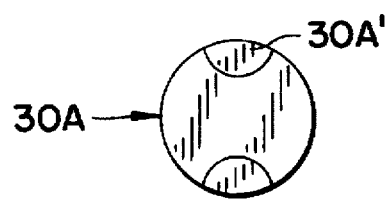
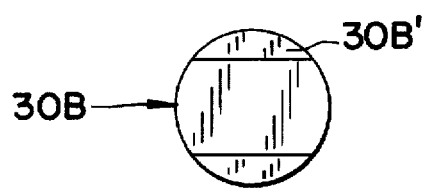
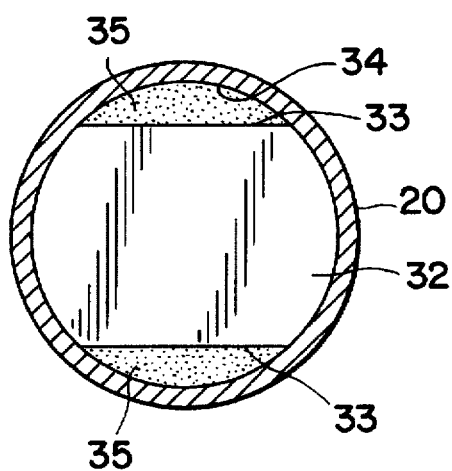
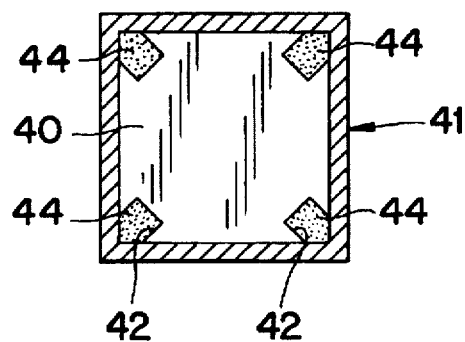
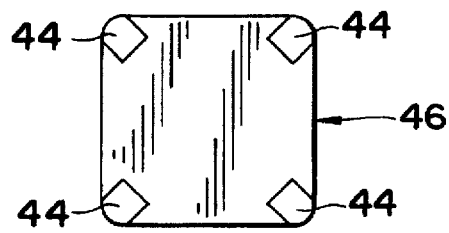
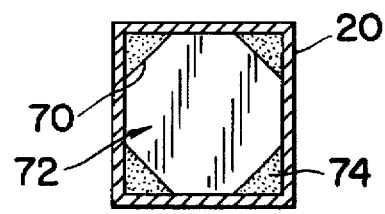
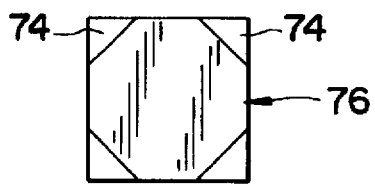

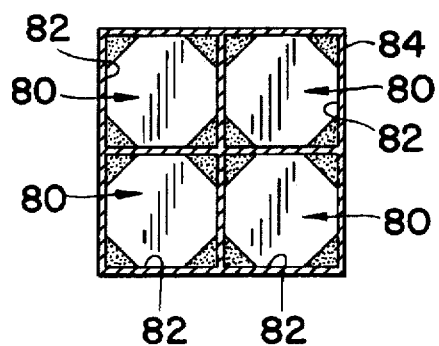
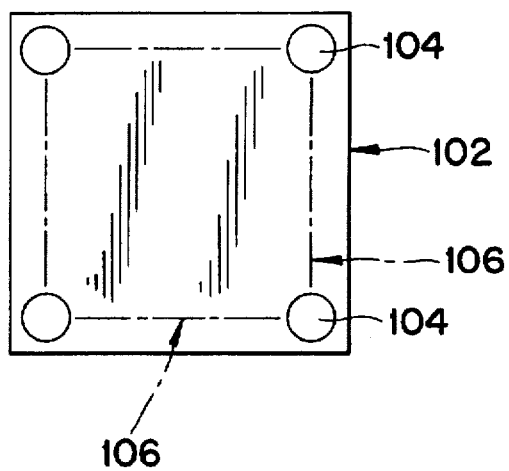
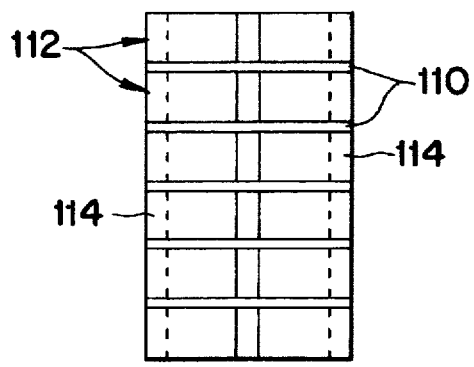
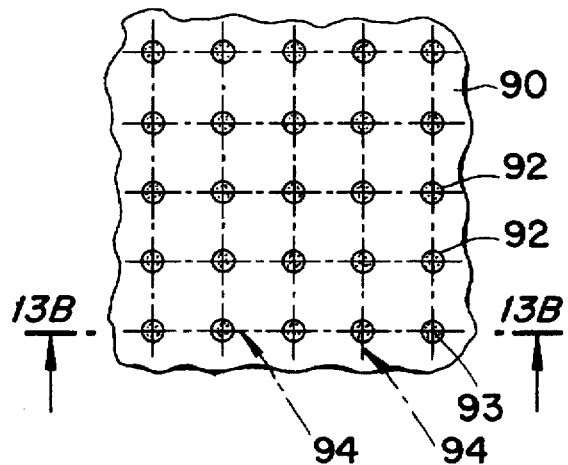
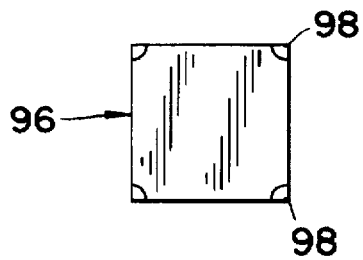
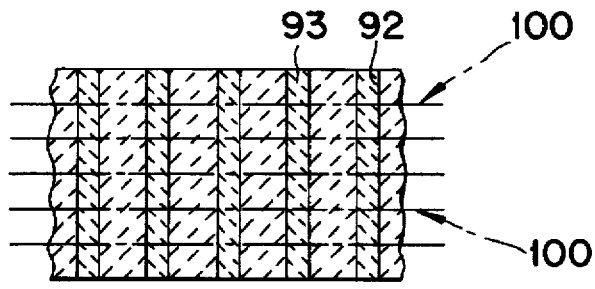

METAL CUTTING INSERTS HAVING SUPERHARD ABRASIVE BODIES AND METHODS OF MAKING SAME

RELATED INVENTION

This application is a Continuation of application Ser. No. 08/446,490, filed May 22, 1995, now abandoned.

This invention is related to that disclosed in U.S. Ser. No. 08/446,487, filed May 22, 1995.

BACKGROUND OF THE INVENTION

The present invention relates to metal-cutting inserts having cutting edges formed of a superhard abrasive, such as polycrystalline cubic boron nitride (i.e., PCBN) or polycrystalline diamond (i.e., PCD), for example, and a method of making same.

Metal cutting inserts having cutting edges formed of a superhard abrasive, such as PCD, are usually used for the machining of non-ferrous alloys such as brass, magnesium and aluminum, and the like, whereas inserts with cutting edges formed of a superhard abrasive, such as PCBN are usually used for the machining of cast iron and hardened steel and the like.

The inserts are made in two different ways, namely (i) by sintering, under elevated pressure and temperature, a PCBN or PCD material into a solid body that is finished to form the final insert shape, or (ii) by bonding a layer of PCBN or PCD, under elevated pressure and temperature to a substrate (usually a cemented carbide disc), from which smaller pieces (chips) are cut out. These chips are then brazed onto a regular carbide insert and ground to the finished size. Inserts are relatively expensive to produce in that way due to the many steps the product must undergo before it is finished. Also, usually only one or two superhard corners per insert are available.

Disclosed in Dodsworth U.S. Pat. No. 4,866,885 is a technique for making metal-cutting inserts wherein shallow recesses are formed in a surface of a cemented carbide substrate at locations spaced inwardly from an outer periphery of the substrate. Each recess is filled with hard abrasive particles such as PCD or cBN. The substrate and abrasive particles are then subjected to a sintering operation at elevated temperature and pressure conditions, whereupon the abrasive particles become sintered to each other and bonded to the carbide body. The substrate is then severed along lines extending through the abrasive bodies to produce generally square cutting inserts having a cemented carbide substrate and abrasive cutting bodies on one side of the substrate. Among the shortcomings of such a procedure are that the insert has abrasive bodies on only one side. In order to provide such bodies on the other side, additional recesses would have to be formed on that side and filled with superhard abrasive material. Also, the wire cutting involves an additional processing step.

It would, therefore, be desirable to increase the number of abrasive bodies on an insert in order to decrease the cost per cutting corner, and to do so without unduly increasing the number of processing steps and overall cost of insert manufacture.

SUMMARY OF THE INVENTION

The present invention relates to a metal cutting insert, and methods for making the insert. The insert comprises a substrate having first and second side surfaces interconnected by an edge surface, and a body of superhard abrasive material bonded to the edge surface and extending from the first side surface to the second side surface.

Preferably, the first and second side surfaces are of polygonal shape such that the edge surface comprises a plurality of segments interconnected to form corners of the insert, with the superhard abrasive body being disposed at least at one of the corners. Most preferably, there is a body at more than one of the corners.

The superhard abrasive bodies may be provided in a groove formed in the edge surface of the substrate and extending from the first side surface to the second side surface.

The superhard abrasive material is preferably selected from a group comprising PCD and PCBN. The method of making the metal cutting insert involves causing the superhard abrasive material to be sintered together and simultaneously bonded to the substrate inside a container under elevated pressure and temperature conditions. The substrate has first and second side surfaces interconnected by an edge surface. The superhard abrasive material is applied to the substrate so as to extend along the edge surface from the first side surface to the second side surface.

The substrate may be in the form of an elongate rod which is sliced transversely into a plurality of inserts, each having a pair of opposite side surfaces interconnected by an edge surface, with the body extending from one side surface to the other.

Alternatively, there could be provided in the container a plurality of substrates arranged one above the other. The substrates would be separated from one another by a separator. The substrates would be separated from the separator following the application of elevated temperature and pressure.

The substrate within the container could be provided with holes spaced from the edge surface and extending therethrough from the first side surface to the second side surface. The holes would be filled with superhard abrasive material. Subsequent to the application of elevated temperature and pressure, a portion of the substrate would be removed to expose a portion of the superhard abrasive material extending from the first side surface to the second side surface.

The substrates could be loaded into the container in a manner providing a space between the container and the edge surface of each substrate. The superhard abrasive material would be introduced into the space.

The container could be provided with a plurality of coplanar chambers. The substrates would be inserted into respective chambers, and the elevated temperature and pressure would be applied to the chambers simultaneously.

BRIEF DESCRIPTION OF THE DRAWINGS

The objects and advantages of the invention will become apparent from the following detailed description of the preferred embodiments thereof in connection with the accompanying drawings in which like numeral designate like elements and in which:

FIGS. 7 and 8 are plan views of two alternative insert configurations, respectively;

FIG. 9 is a sectional view through a sintering container depicting another type of substrate that can be used;

FIGS. 10A and 10B depict steps involved in the forming of metal cutting inserts according to yet another embodiment of the invention;

FIGS. 11A and 11B depict steps involved in the formation of a metal cutting insert in accordance with still another embodiment of the invention;

FIG. 12 is a sectional view taken through a sintering container having coplanar chambers in accordance with another embodiment of the invention;

FIGS. 13A through 13C depict steps involved in the forming of a metal cutting insert according to another embodiment of the invention;

FIG. 14 is a plan view of a substrate to be made into an insert according to still another embodiment of the invention; and FIG. 15 is a side elevational view of a stack of inserts separated by separators in accordance with yet another embodiment of the invention.

DETAILED DESCRIPTION OF PREFERRED EMBODIMENTS OF THE INVENTION

Figure 1A:
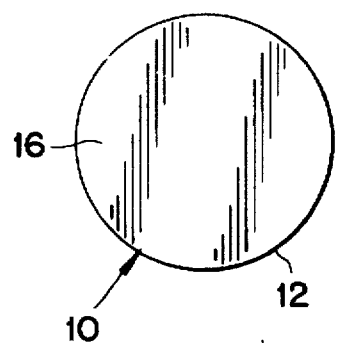
FIGS. 1A though 5 depict steps performed during the manufacture of an insert according to one embodiment of the invention.
Figure 2A:
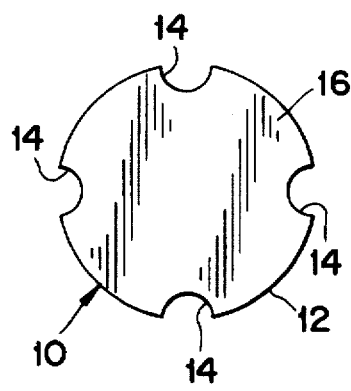
Figure 3A:
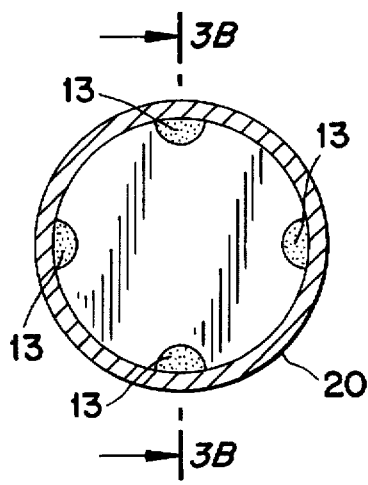
Figure 1B:
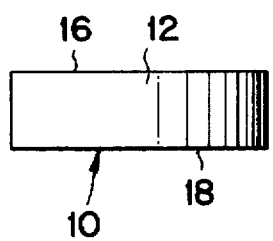
Figure 2B:
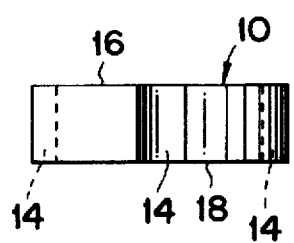
Figure 3B:
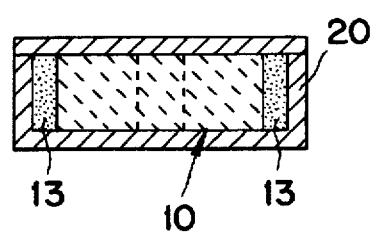
Figure 4:
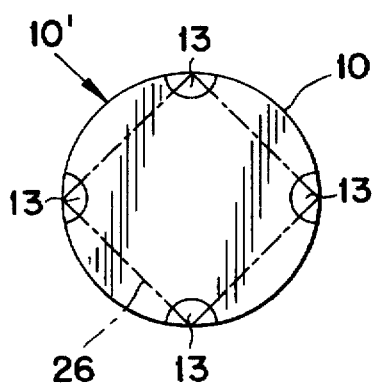
Figure 5:
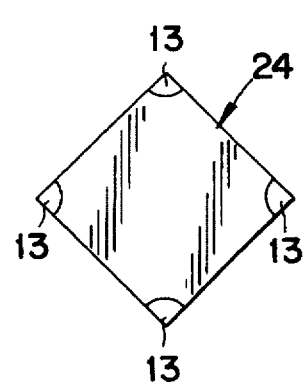

Depicted in FIGS. 1A through 5 are steps involved in the making of a first preferred embodiment of a metal cutting insert. A blank or substrate in the form of a circular disc 10 (preferably tungsten carbide) is provided as shown in FIG. 1. The edge surface 12 of the substrate which interconnects the side surfaces 16, 18 thereof is provided with at least one longitudinal groove 14 extending along its entire length, i.e., from one side surface 16 to the other side surfaces 18. The grooves 14 can be of any shape such as multi-sided or continuously curved, e.g. semi-circular as shown. Four such grooves are shown in FIGS. 2A, 2B at ninety degree intervals. The substrate 10 is placed in a correspondingly shaped container 20 (FIGS. 3A, 3B), and the grooves 14 are filled with a material 13 which includes superhard (ultrahard) abrasive particles (hereinafter referred to as an "abrasive particles") such as PCD (with a binder metal) or PCBN. The material 13 can be in the form of a loose powder, or pre-pressed green compacts. The container 20 is then sealed, and a conventional sintering operation is performed at elevated temperature and pressure conditions, whereupon the abrasive particles become bonded directly to each other and to the side walls of the grooves 14. The substrate 10 and the abrasive bodies 13 together define a blank 10' in which the abrasive bodies 13 are disposed entirely within the confines of the respective grooves 14 (see FIG. 4).

Thereafter, the blank 10' is removed from the container (see FIG. 4) and machined (preferably by grinding) along lines 26 to form an insert 24.

It will be appreciated that the insert 24 has abrasive bodies extending for the entire thickness of the substrate, so those abrasive bodies are available for cutting at both side surfaces of the insert. In order to achieve a similar result with a conventional method (e.g., the method disclosed in the aforementioned U.S. Pat. No. 4,866,885) wherein abrasive portions are formed in shallow recesses, it would be necessary to form eight separate recesses, rather than the four grooves of the present invention. Thus, the present invention provides significant savings in terms of manufacturing cost and effort.

In metal-cutting tests performed on inserts made according to the present invention, the abrasive bodies functioned in an acceptable manner while remaining adhered to the sides of the grooves 14. That is, the bonds formed between those sides and the abrasive bodies were able to withstand the forces imposed during a typical metal-cutting operation which would tend to shear the bodies from the substrate.

In accordance with the present invention, the number of abrasive bodies and their location can be chosen in accordance with the type of insert that is to be produced. It would be preferable to provide as many abrasive bodies as possible to maximize the number of abrasive edges per insert.

Figure 6:
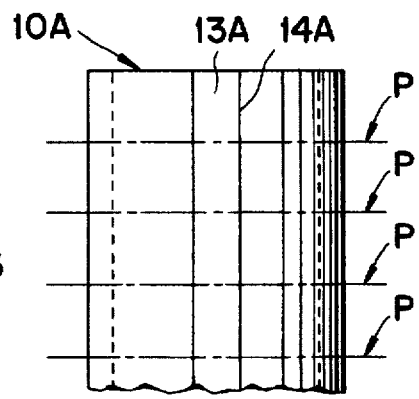
FIG. 6 is a side elevational view of an alternate type of substrate that can be used in the invention.

If desired, the substrate could be in the form of a cylindrical rod 10A as shown in FIG. 6. The recesses would be in the form of longitudinally elongated grooves 14A filled with a superhard abrasive particles. Following the sintering step, the substrate would be sliced along parallel planes P oriented perpendicular to the longitudinal axis of the substrate to form individual inserts.

The inserts can be of any desired shape. For example, in FIGS. 7 and 8, two insert embodiments 30A and 30B, respectively, are depicted each of which is of circular shape and has two abrasive bodies 30A' and 30B'.

In lieu of providing a substrate with grooves or recesses for receiving abrasive particles, the substrate 32 could be dimensioned so that one or more segments 33 of the outer periphery thereof are spaced from opposing sides of the container 20 to form spaces 34 therewith, as shown in FIG. 9. The spaces would be filled with a material 35 containing superhard abrasive particles, and then the sintering step would be performed to form the insert 30B shown in FIG. 8.

It may be desirable to sinter the insert directly into a required multi-corner shape. For example, depicted in FIG. 10A is a rectangular substrate 40 disposed in a container 41 with recesses 42 formed at respective corners of the substrate, the recesses filled with superhard abrasive material 44. After sintering, there results an insert 46 as shown in FIG. 10B (with the corners ground smooth). This embodiment presently less preferred, since during the sintering of a multi-cornered substrate within the container, the corners can act as stress risers that cause cracking.

Another way to form abrasive bodies at the corners of an insert is depicted in FIGS. 11A and 11B. The corner portions 70 of a cemented carbide substrate 72 are truncated, and the resulting triangular spaces formed between the rod and container 20 are filled with the abrasive powder 74 (or pre-pressed green compacts) which are then subjected to high temperature and pressure conditions to form an insert 76.

One way to make multiple inserts simultaneously involves placing substrates in the form of thin disks 80 in respective coplanar chambers 82 of a container 84 (see FIG. 12). A plurality of separate inserts would thus be simultaneously formed in one container during the high temperature/high pressure procedure. This method can be used to form inserts of any desired shape, including round.

Depicted in FIGS. 13A–13C is another method embodiment wherein a carbide substrate 90 has a plurality of holes 92 formed therein in a regular pattern, in any suitable manner, e.g., at the time of fabricating the substrate or thereafter. The holes extend completely through the substrate and are filled with abrasive material 93 (i.e., powder or compacts) and then the high temperature/high pressure sintering process is applied to the substrate within a container (not shown). Thereafter, individual inserts 96 (see FIG. 13C) are cut from the substrate by wire EDM along the lines 94 extending parallel to the holes 92, whereby the inserts have abrasive bodies 98 at the corners.

The substrate 90 could be relatively thin, i.e., having a thickness equal to the insert thickness. Alternatively, the substrate 90 could be of greater thickness as shown in FIG. 13B, with wire EDM slicing being performed along the lines 100, the lines 100 passing through the holes 92 perpendicular thereto.

Instead of forming a solid substrate with holes as shown in FIG. 13A, a series of blanks having their corners cut off could be arranged against one another in coplanar fashion such that each hole shown in FIG. 13A would actually be formed by the cut-off corners of four blanks.

Instead of utilizing a large substrate, as in FIG. 13A, a smaller substrate 102 could be used (see FIG. 14) in which a plurality of holes 104 is formed completely through the substrate. Those holes 104 are spaced inwardly from an outer perimeter of the substrate, and are filled with abrasive material prior to a high pressure/high temperature process. Then, the substrate 102 is cut by EDM wire, or machined, along lines 106 to form an insert profile similar to that shown in FIG. 13C. The substrate 102 could comprise a thin (wafer) substrate so as to form a single insert, or the substrate could comprise an elongated rod which is transversely sliced to form separate wafers prior to the machining or cutting along lines 106.

One way of avoiding the need for slicing a substrate along transverse cut lines was disclosed in connection with FIG. 12, i.e., by arranging separate substrates in coplanar relationship. Yet another way is to provide separators 110 between the individual blanks 112 of a stack of blanks, as shown in FIG. 15, which is otherwise based upon the method disclosed in connection with FIGS. 1A through 5. The separators 110, are formed of a material which will not bond to, or at least form only a relatively shallow bonding (reaction) zone with, the substrate and superhard abrasive. For example, the separators could be formed of Nb, Mo, and Zr which could be removed by being dissolved chemically in caustic. The remaining shallow bonding zone could then be ground away. Alternatively, the separators could be formed of a material having a high melting temperature and low shear strength, such as Na Cl, graphite, Mica, talc, Al2O3, hexagonal boron nitride (HBN) for example. Due to the low shear strength, the separators can be broken off, and the bonding zone machined away, as described above. The substrates 102 are introduced into a container (not shown) along with the separators 110. To load the container, each separator would be inserted once the grooves of a previously inserted substrate have been filled with abrasive material.

It will be appreciated that the separators 110 can be used in connection with the methods disclosed earlier herein (except for the method disclosed in connection with FIG. 12).

As noted earlier herein, the abrasive bodies employed in connection with the present invention can be applied to substrates (blanks) of any suitable shape or which are subsequently ground to a suitable shape (e.g., round, square or non-square rectangular, triangular, rhombic, trapezoidal, etc.), with or without a center hole. The abrasive bodies themselves can be of any shape and located anywhere on the insert as long as the cutting work of the finished insert would be performed essentially by the abrasive bodies. Although the abrasive bodies located at the corners are shown as being symmetrical with respect to those corners, the bodies could instead be asymmetrically disposed with respect thereto. Abrasive bodies of the same or different shapes may be provided on the same insert. The abrasive bodies can, if desired, be reshaped (e.g., by grinding) after being bonded to the substrate.

The abrasive powder preferably comprises PCD or PCBN particles mixed with other hard and wear-resistant constituents such as carbides, nitrides, carbonitrides, oxides, borides of the metals of groups IVa to VIa of the periodical system preferably Ti as known in the art. Particularly good results have been obtained with compositions of MN90. The assembly is then subjected to conventional elevated temperatures and pressures for producing high pressure materials, e.g., as disclosed in U.S. Pat. Nos. 4,991,467 and 5,115,697 (the disclosures of which are incorporated herein by reference).

Since the cemented carbide substrate essentially does not take part in the cutting operation performed by the manufactured inserts, its composition is chosen such that it provides a good bond to the PCD or PCBN abrasive, is easy to grind and contains inexpensive components and suitable fracture resistance. Preferably, a cemented carbide having 10–20% Co by weight, most preferably about 15–17%, is used. Particularly good results have been obtained with a grade of 16%. Instead of cemented carbide, titanium based carbonitrides (so-called cermets) can be used. Inserts according to the invention can further be provided with thin wear resistant coatings preferably applied by conventional PVD or CVD methods.

EXAMPLE 1

In a cylindrical rod-shaped cemented carbide blank with a diameter of about 22 mm with 16% Co by weight, four grooves were equidistantly ground along the edge surface of the blank, each groove having an essentially semicircular cross section. The grooves were filled with a PCBN powder mixture (Megadiamond grade MN90) and then enclosed in a container and sintered at high temperature and high pressure according to the process described in U.S. Pat. No. 5,115,697. The blank was then ground at the ends and centerless ground and then ground to a square shape and cut transversely into slices about 5 mm thick. The slices were ground to form inserts of style SNGN 120408. Upon observation, there seemed to be good contact between the PCBN and the cemented carbide blank.

EXAMPLE 2

Inserts from Example 1 were tested in an interrupted turning operation under the following conditions:

Workpiece material: Grey cast iron SS0125

Speed: 400 m/min

Feed: 0.15/0.25/0.35 mm/rev

Depth of cut: 1 mm

Dry cutting

The inserts were used for 280 passes without serious damage. The strength of the bond between PCBN and the cemented carbide blank withstood all passes.

EXAMPLE 3

Example 2 was repeated using coolant and a cutting speed of 500 m/min. The strength of the bond between PCBN and the cemented carbide blank remained sufficient.

EXAMPLE 4

Example 2 was repeated but with a feed rate of 0.5 mm/rev with and without coolant. Two edges of the insert were tested and both were undamaged after 170 passes. They could have been further machined if desired.

EXAMPLE 5

Example 3 was repeated with a 3 mm thick insert and feed rate 0.4 to 0.6 mm/rev wet or dry machining.

In the dry condition, the feed rate was increased form 0.4 to 0.5 mm/rev after 200 passes and then again to 0.6 mm/rev after 400 passes. When the test was stopped after 600 passes the edge had clean, even flank wear, no crater wear and no signs of chipping or other damage.

In the wet condition, the whole corner fractured after 383 passes at a feed rate of 0.4 mm/rev and after 186 passes at a feed rate of 0.6 mm/rev. In both cases the whole corner was destroyed. The fracture took place entirely within the PCBN body and not in the PCBN/cemented carbide joint, indicating that the bond is sufficient also in this case.

It will be appreciated from the foregoing that the present invention enables metal cutting inserts to be manufactured having superhard abrasive bodies on both side surfaces of the inserts, in a relatively low-cost manner. The inserts thus exhibit very favorable cost per abrasive edge ratio, and provide a maximum number of useful cutting edges.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A metal cutting insert comprising a substrate having first and second side surfaces interconnected by an edge surface, at least one groove disposed in the edge surface and formed by a wall which intersects the edge surface at two spaced locations; the wall being continuously curved from one of the locations to the other, and a body of superhard abrasive material sintered in situ in the groove whereby the abrasive material forms a directly sintered bond with the wall of the groove, the directly sintered bond extending from the first side surface to the second side surface.

2. The insert according to claim 1, wherein the first and second side surfaces are of polygonal shape such that the edge surface comprises a plurality of segments interconnected to form corners of the insert, the body disposed at least at one of the corners.

3. The insert according to claim 2, wherein there is a body at each of the corners.

4. The insert according to claim 1, wherein there is provided a plurality of the bodies, the bodies arranged in spaced relationship around the edge surface.

5. The insert according to claim 1, wherein the first and second side surfaces are round.

6. The insert according to claim 1, wherein the substrate comprises a carbide.

7. The insert according to claim 6, wherein the superhard abrasive material is selected from a group comprising PCD and PCBN.

8. The insert according to claim 1, wherein said insert is coated with a PVD coating.

9. The insert according to claim 1, wherein said insert is coated with a CVD coating.

10. A blank for use in making a cutting insert, comprising a substrate having first and second side surfaces interconnected by an edge surface, at least one groove formed in the edge surface by a wall which intersects the edge surface at two spaced locations, then being continuously curved from one location to the other, and a body of superhard abrasive material sintered in situ in the groove whereby the abrasive material forms a directly sintered bond with the wall of the groove, the directly sintered bond extending from the first side surface to the second side surface, the abrasive material disposed entirely within the confines of the groove.

* * * * *